United States Patent [19]
Klopfenstein

[11] Patent Number: 5,209,506
[45] Date of Patent: May 11, 1993

[54] VEHICLE WITH COMBINED PROPULSION AND STEERING MECHANISM

[76] Inventor: King L. Klopfenstein, 10 Drake Terrace, Prospect Heights, Ill. 60070

[21] Appl. No.: 856,497

[22] Filed: Mar. 24, 1992

[51] Int. Cl.$^5$ .......................... B62K 21/00; A61G 5/02
[52] U.S. Cl. ........................ 280/240; 74/143; 280/243; 280/246; 280/248; 280/268; 280/269
[58] Field of Search ............... 280/240, 242.1, 243, 280/246, 247, 248, 249, 263, 267, 268, 269, 282; 74/143, 496

[56] References Cited

U.S. PATENT DOCUMENTS 4,811,964 3/1989 Horn ..................... 280/243 X

Primary Examiner—Russell D. Stormer
Assistant Examiner—Andrew C. Pike
Attorney, Agent, or Firm—Charles F. Lind

[57] ABSTRACT

The rider powered vehicle has two steerable front wheels, each with a turning arm, and a single rear drive wheel. Power transmission means is provided between the rear wheel and a single push-pull and steerable handlebar mounted in a column assembly supported to oscillate about a lateral pivot axis. The handlebar is connected to a steering arm, and two steering links are connected at respective inboard and outboard pivotal connections between the steering arm and the two turning arms. Handlebar rotation causes the inboard pivotal connections to trace an arcuate path, and the lateral pivot axis is located to intersect the arcuate path generally at two spaced locations. This geometry provides a propulsion and steering mechanism that has substantially no interaction between the push-pull power strokes of the handlebar, for vehicular propulsion, and the handlebar rotation, for vehicular steering.

18 Claims, 5 Drawing Sheets

VEHICLE WITH COMBINED PROPULSION AND STEERING MECHANISM

BACKGROUND OF THE INVENTION

This invention relates to arm powered and arm steered vehicles, with two steerable front wheels, for the use primarily by paraplegics, for their enjoyment and exercise.

There are in existence a number of designs of arm powered and arm steered vehicles for paraplegics.

One such vehicle has a single front wheel and two rear wheels, and a drive sprocket assembly is mounted to the front steering column (in place of the handlebar) to both steer and drive the front wheel, except the foot pedals for rotating the sprocket have been replaced with appropriate hand grips. Rotating the drive sprocket with the hand grips provides, through a chain and sprocket transmission with a standard 3-speed bicycle hub in the front wheel, power to the steerable front wheel. The use of rotary hand motion for propulsion, where the arms are required to push with one hand and simultaneously pull with the other hand, is not a desirable or efficient means to provide torque to the drive wheel, especially during turning, as it generates unwanted vehicle steering along a serpentine path even while trying to maintain a straight path. Moreover, this propulsion action requires torsional spinal control and related strength, which can be a problem for many paraplegics.

Another vehicle design uses two vertical levers pivoted at their lower ends in front and to each side of the rider's seat and having hand grips at their upper ends. These two levers provide independent propulsion through appropriate power transmission means to a 3-speed hub in each of the two rear wheels, but propulsion only occurs in pulling on the levers. The single front wheel is steered by the rider shifting his weight laterally of a pivotal cycle frame, which through linkage rotates the front wheel's mounting. Again, many potential users would be excluded from using this type drive because of deficient spinal column strength and control.

Another vehicle has two steerable front wheels and a single rear wheel driven via suitable transmission means by pulling on two oppositely oscillating vertical side levers, which again, would exclude many potential users having inadequate deficient spinal column strength and control. Steering is accomplished by swinging these levers to the right or left which though suitable steering linkage turns the two front wheels.

OBJECTS AND SUMMARY OF THE INVENTION

A basic object of the present invention is to provide a more stable and efficient arm propelled vehicle that can safely be used by many, even a paraplegic.

A further object of the invention is to provide a three wheel vehicle having two opposed, smaller, steerable front wheels and a larger single rear drive wheel, to permit the use of many standard bicycle components.

Another object of the invention is to provide a vehicle having a propulsion and steering system operated by a single handlebar, while yet having no undesirable interaction between the propulsion and steering functions.

Still another object of the invention is to provide a vehicle propulsion and steering system of the previous object, which a user powers with both arms by simultaneously pushing and then simultaneously pulling the single handlebar, with power being transferred in both the pushing and the pulling movements of the handlebar and without adversely steering the vehicle.

Yet another object of the invention is to steer the vehicle by turning the single handlebar, and provide suitable steering linkage for the two front wheels to ensure that both front wheels turn the required angle to have each follow a curvilinear track of proportional radius.

In accomplishing these and other objects, the present invention contemplates a steering and propulsion arrangement having a bicycle handlebar, a steering shaft and column assembly pivotally mounted to the vehicle frame to oscillate about a lateral, horizontal, pivot axis to allow a push-pull action of the handlebar, forwardly and rearwardly of the vehicle, and suitable drive connections between the column assembly and drive wheel to propel the vehicle with this action. Two overrunning clutches provide propulsion during both the push and pull motions. Handlebar rotation is used to steer the vehicle, and special linkage arrangements including the steering shaft, steering arm, and connecting links allow simultaneous propulsion and steering motions with minimal adverse interaction. The use of the single handlebar operated in the push-pull manner by both hands minimizes not only unwanted serpentine steering action but also the need for normal torsional spinal control and strength. The column assembly pivot axis is located to pass generally through the arcuate path defined by the connection of the links and steering arm, regardless of the column location in the propulsion stroke, to effectively minimize adverse interaction between the propulsion and steering motions.

The present invention may be used in combination with the wheel and power transmission portion of a conventional bicycle having a five-, ten-, twelve- or eighteen-speed derailer system and hand brakes. The present invention may use a variation of the drive system of my U.S. Pat. No. 4,561,668 (by substituting the push-pull handlebar for the oppositely reciprocating pedals) as the means to power the vehicle.

DESCRIPTION OF PREFERRED EMBODIMENTS

Figure 1:
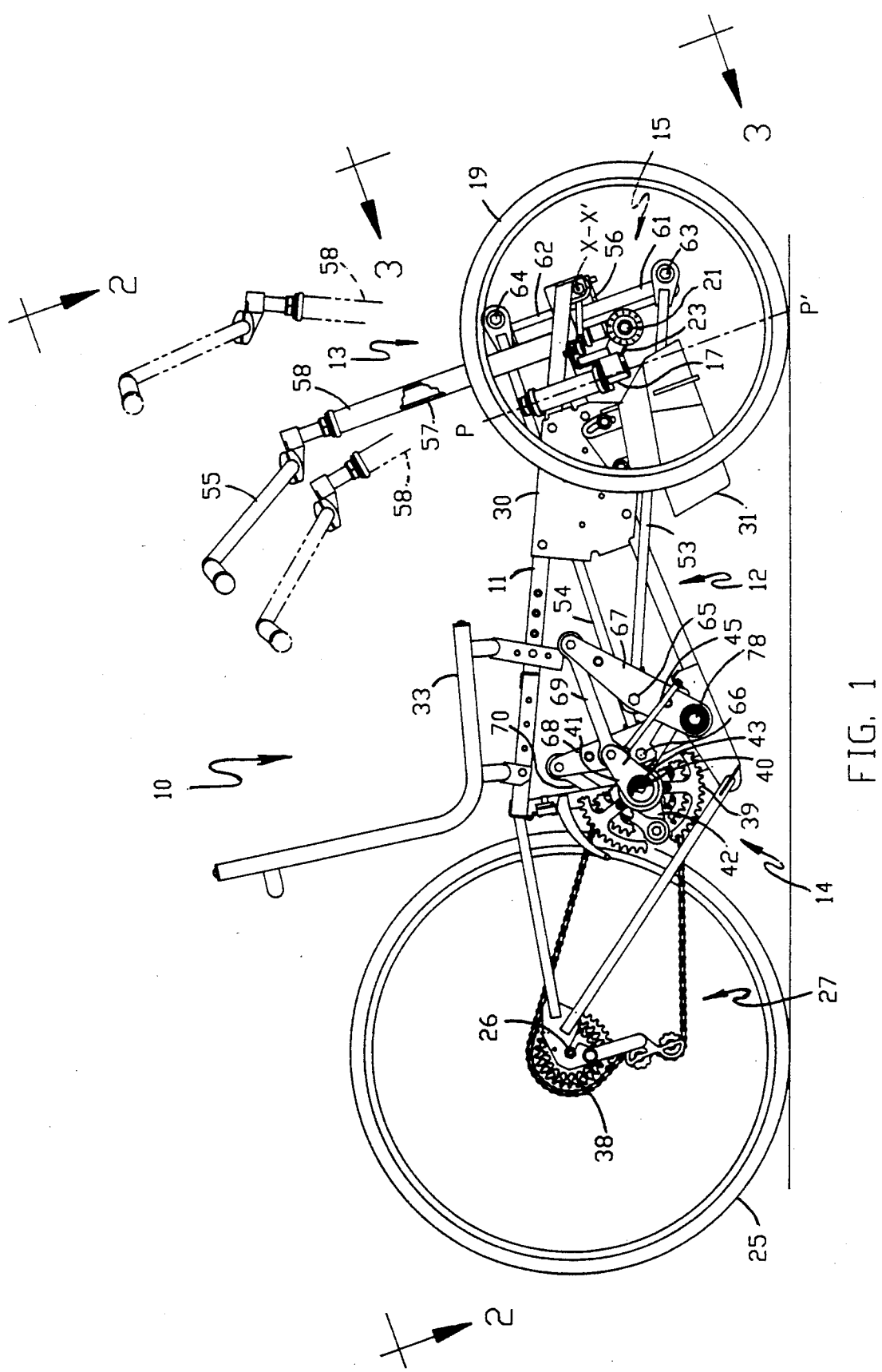
FIG. 1 is a side elevational view of a first embodiment of a three wheel vehicle formed according to the subject invention, illustrating the handlebar and column assembly in solid in an intermediate driving position and in phantom in the maximum forward and rearward driving positions, and illustrating the drive assembly in the position corresponding to the phantom-illustrated maximum forward driving position of the handlebar and column assembly.
Figure 2:
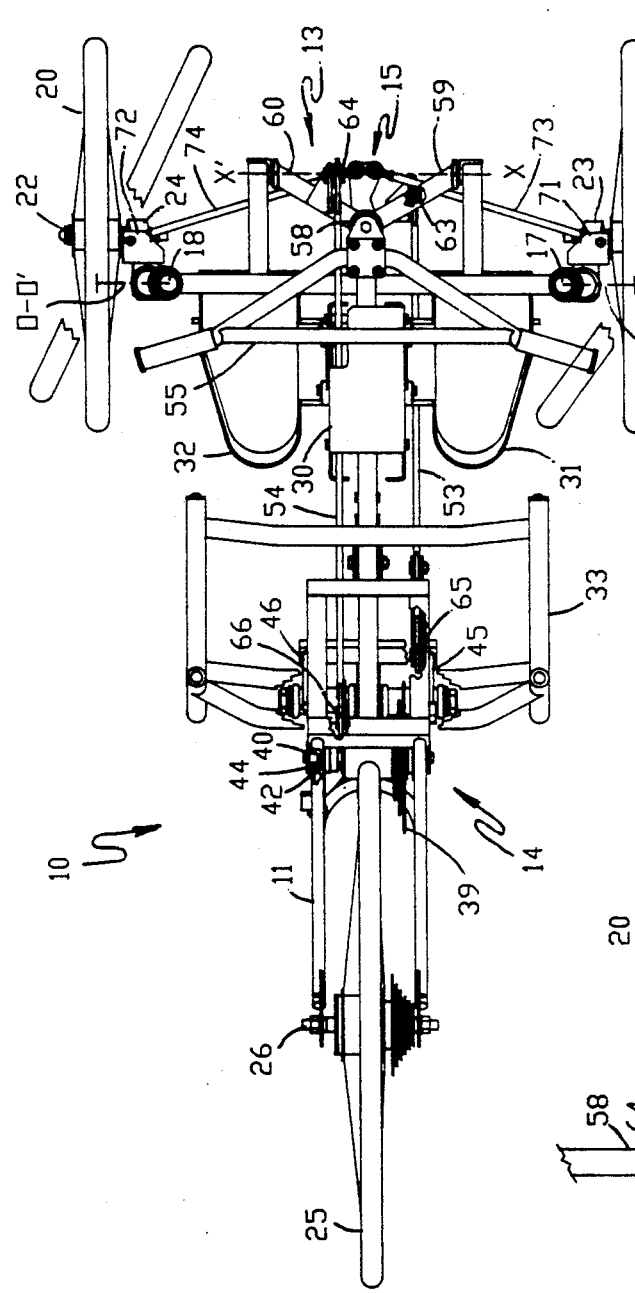
FIG. 2 is an oblique plan view of the vehicle of FIG. 1, taken along sight line 2—2 therein angled normal to the plane common to the pivot axes (P—P' and O—O') of the two front wheels and illustrating the front wheels in solid oriented for straight ahead vehicle movement and in phantom for making a maximum right turn.
Figure 3:
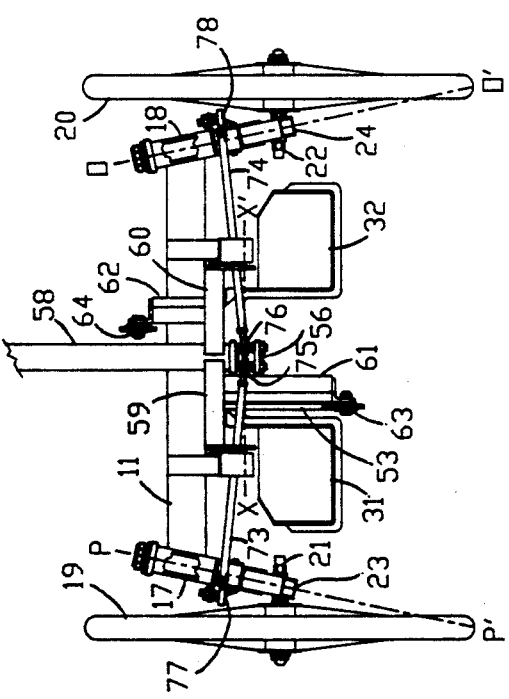
FIG. 3 is a partial oblique front view of the vehicle of FIG. 1, taken along sight line 3—3 therein substantially perpendicular to sight line 2—2.

Referring to FIGS. 1, 2, and 3, the illustrated three wheel vehicle 10 incorporates: a frame 11 supporting the front wheels 19 and 20, and rear wheel 25; a pivotal steering means 13 and a connecting means 15 for the front wheels; and a linkage and bearing system 12 and drive assembly 14 for the rear wheel. The pivotal steering means 13 includes right and left turning shafts 17 and 18, and right and left wheel support arms 23 and 24, respectively, for holding the right front wheel 19 with a right front wheel axle 21, and the left front wheel 20 with a left front wheel axle 22, respectively. The wheels are mounted to rotate about generally horizontal axes, and the front wheels are steered about generally vertical axes. Center lines P—P' and O—O' depict the centers of right and left turning shafts 17 and 18, and in the illustrated embodiment diverge in a downward direction outwardly and are angled forwardly and define their respective turning axes, with the lower projections of the center lines P—P' and O—O' passing through the support surface upon which vehicle 10 is positioned. The outward divergence from the vertical of axes O—O' and P—P' might be of the order of 5-15 degrees each, to accomodate the illustrated linkages and wheel chair or cantilevered type hubs; although with other linkages this divergence of the axes possibly could be eliminated and the axes could be substantially parallel. The diverging center lines P—P' and O—O' minimizes the transmission of unwanted torque via the connecting means 15 caused when the front wheels 19 and 20 of vehicle 10 travel over irregular terrain. The forward angle illustrated might be of the order of 15-25 degrees from the vertical, to provide suitable caster action in training the steering wheels straight ahead, although this angle likewise could be reduced to zero with a resultant reduction of steering stability. The front wheel mounting geometry is disclosed in my U.S. Pat. No. 4,903,857.

While vehicle 10 is shown using a conventional multiple speed chain and derailer system 27 as means to transmit power to the rear wheel 25, the wheel being rotatably connected at axle 26 to frame 11, the present invention is not limited to this type of drive arrangement but may use virtually any bicycle chain drive means. The chain and derailer system 27 includes the cooperating sets of sprockets 38 and 39.

Right and left foot supports 31 and 32 are connected to the frame 11 by a mounting bracket 30. A seat frame 33 (as commonly used with recumbent type bicycles) is also connected to the frame 11, having a conventional webbing for rider support and having a conventional seat belt attached to the back of the seat frame 33 to support the upper body of the (paraplegic) rider against the seat when pulling on the handlebar to propel the vehicle 10. Neither the webbing nor seat belt is illustrated to permit more details of the drive assembly 14 to show. Again, although not shown, the vehicle 10 would also incorporate a conventional bicycle wheel brake assembly, and hand controls for operating the brake and the chain drive derailer assemblies.

The drive assembly 14 includes: a drive shaft 40 rotatably mounted to the frame 11; right and left drive arms 41 and 42 which house right and left overrunning clutches 43 and 44, respectively, as the means to selectively key each respective arm to the drive shaft 40; and right and left stop rods 45 and 46 mounted to frame 11 as the means to limit the rotation of the right and left drive arms 41 and 42, respectively. The drive assembly 14 is an adaption of the reciprocating drive disclosed in my U.S. Pat. No. 4,561,668.

Figure 5:
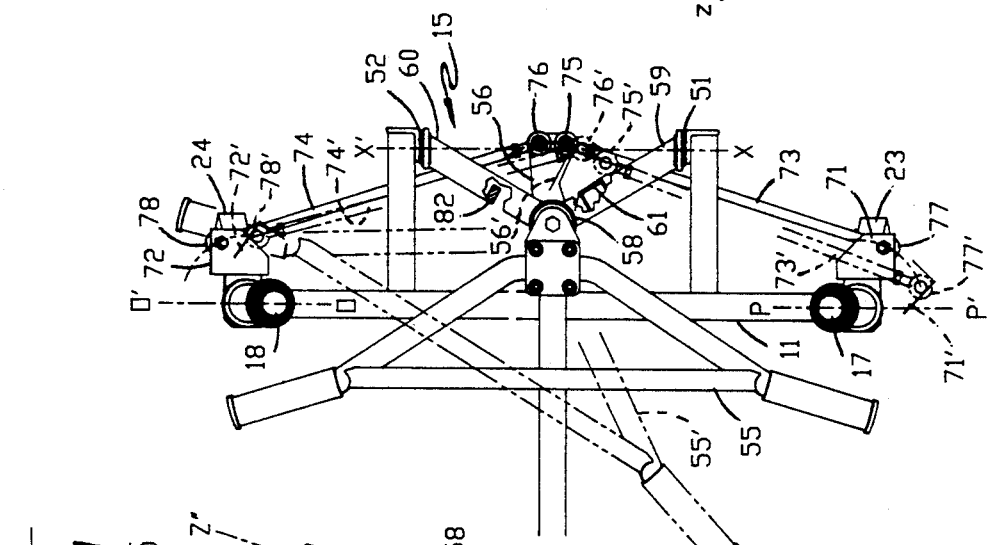
FIG. 5 is an oblique plan view of FIG. 4, taken along sight line 5—5 therein normal to the column in the mid driving position, illustrating the steering linkage in solid in the position of straight ahead vehicle steering and in phantom in the displaced position for making a maximum right turn.
Figure 4:
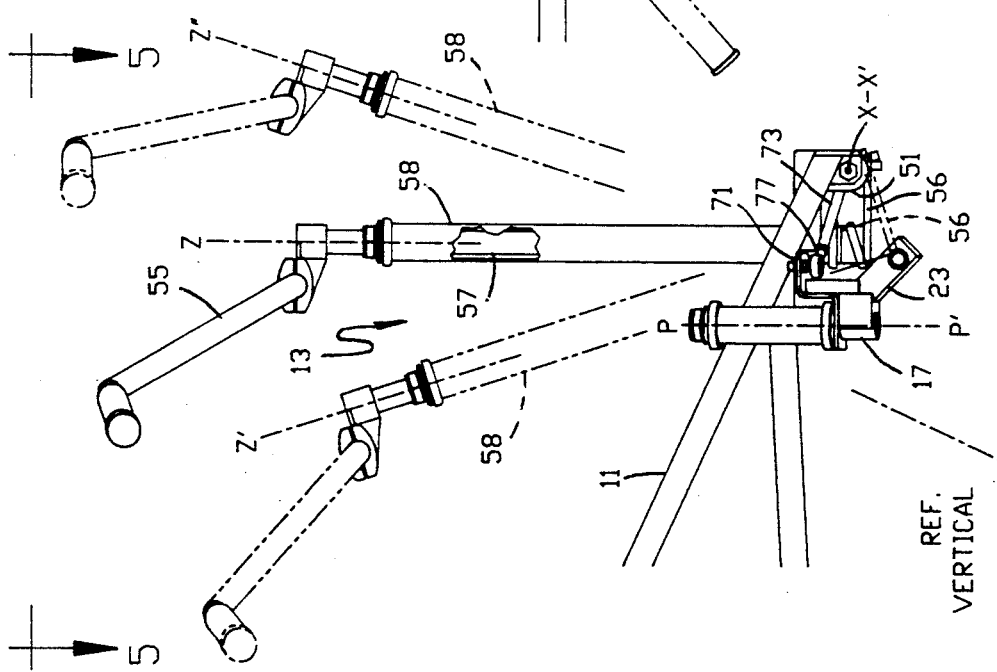
FIG. 4 is an enlarged side elevational view, similar to FIG. 1 except having the view squared on the page approximately according to the illustrated vertical reference line, and showing also in phantom the maximum forward and rearward driving positions and in solid the mid driving position of the column and handlebar, and showing additional details of the steering linkage while omitting details of the drive linkage for simplification of the drawing.

Referring also now to FIGS. 4 and 5, details of the linkage and bearing system 12 and the pivotal steering means 13 will be disclosed. A handlebar 55 is connected to a steering arm 56 via steering shaft 57, and the shaft is rotatably housed in a column 58. The column 58 is part of a unitary assembly including diagonal forwardly extended right and left arms 59 and 60, which are pivoted at right and left bearing housings 51 and 52, respectively to frame 11, to rotate the column assembly as a unit about pivot axis X—X'. The column assembly also includes right finger 61 and left finger 62 that carry link bearings 63 and 64, respectively, equally spaced from the axis X—X'. A right link 53 is connected pivotably by bearings 63 and 65 between the right finger 61 and a right drive lever 67, respectively, and the drive lever 67 is pivoted at a shaft 78 to the frame 11; while similiarly, a left link 54 is connected pivotably by bearings 64 and 66 between the left finger 62 and a left drive lever 68, respectively, the drive lever 68 also being pivoted at shaft 78 to the frame. Right and left drive links 69 and 70 are pivotal connected between the right and left drive levers 67 and 68 and the right and left drive arms 41 and 42, of the drive assembly 14.

The rider alternately pushes and pulls the handlebar 55 to oscillate the column 58 about the lateral pivot axis X—X', and the drive links 53 and 54 thereupon oppositely oscillate drive levers 67 and 68 which via links 69 and 70 oppositely oscillate the right and left drive arms 41 and 42 about the drive shaft 40. The forward motion of the drive arms 41 and 42 is limited by engagement with the respective right and left stop rods 45 and 46. The maximum forward position of right drive arm 41 and the corresponding maximum rearward position of the left drive arm 42 are illustrated in FIG. 1. The alternately operated right and left overrunning clutches 43 and 44 housed in the right and left drive arms 41 and 42 torque and rotate the drive shaft 40 in a clockwise direction (relative to FIG. 1), which via the connected sprockets 38 and 39 of the derailer system 27 rotates the rear wheel 25 to drive the vehicle in the forward direction.

The drive linkage system 12 is set to provide that each drive arm 41 and 42 oscillates through an angle of approximately 160-170 degrees, while the corresponding maximum forward and rearward oscillation of the column 58 is between 25-40 degrees or approximately 10-25% (0.10-0.25) of this. The adjacent links of the right drive linkage 61, 53, 67, 69, and 41, and of the left drive linkage 62, 54, 68, 70, and 42, remain angled relative to one another and do not cross a top or bottom dead center orientation during the movements between and even at the maximum forward and rearward positions. This can effectively drive the rear wheel from any column orentation and throughout the entire column oscillation (forward oscillation acting through left drive linkage and rearward oscillation acting through the right drive linkage).

Moreover, the drive arm and adjacent link (see 41 and 69 in FIG. 1) in their maximum forward positions straighten to possibly 160-170 degrees, close to but short of a 180 degree dead center orientation. Likewise, the drive arm and adjacent link (see 42 and 70 in FIG. 1) in their maximum rearward positions remain angled at 30-40 degrees, well short of a 0 degree dead center orientation. This geometry provides for greater torque transmission to the rear wheel at the beginning of the forward or driving rotation of drive arms 41 and 42 than at the end of this rotation, and moreover, reduces the hand-handlebar impact should either drive arm 41 or 42 be powered until it strikes its respective stop rod 45 or 46 (much like the non-shock action of a conventional rotary pedal bicycle drive when crossing its bottom dead center position). The overrunning clutches allow the rider to use an entire or partial propulsion stroke in powering the vehicle 10, and further allow the vehicle to coast between the propulsion strokes. The above is an adaption of the reciprocating drive disclosed in my U.S. Pat. No. 4,561,668.

FIG. 5 illustrates the pivotal steering means 13 in solid in the orientation for straight ahead vehicle steering and fragmented portions of its components are illustrated in phantom lines to show the orientation for a maximum right vehicle turn. The maximum left vehicle turn positions (not shown) would be substantially at the mirror image of these right turn illustrations relative to the midpoint or straight ahead steering positions illustrated in solid. In FIG. 5, the displaced components in the maximum right turn positions are identified by their number followed by the "prime mark", such as the steering arm 56 is identified as 56'. The front wheels 19 and 20 and front wheel axles 21 and 22 have been omitted to simplify the drawing.

A right steering link 73 is connected via inboard link end bearing 75 and outboard link end bearing 77 between the steering arm 56 and a right turning arm 71 rigidly secured to the right turning shaft 17. A left steering link 74 is connected via inboard link end bearing 76 and outboard link end bearing 78 between the steering arm 56 and a left turning arm 72 rigidly secured to the left turning shaft 18. The inboard link end bearings 75 and 76 are shown spaced apart, and this separation should be small; although they could in fact be located coaxially of one another (at midpoint c for example in FIG. 7).

Rotation of handlebar 55 via the steering connecting means 13 effectively steers the front wheels. The geometric relationship of the connecting means 13 is so arranged to provide proportionally increased turning of the inside wheel compared to the outside wheel, or right front wheel 19 when making a right turn or left front wheel 20 when making a left turn, so that both front wheels track properly when making a particular turn. The front wheels might be turned to a maximum turning angle of possibly 30-50 degrees from the straight ahead, and the linkages may provide that the outer wheel in this orientation may angle 5-15 degrees less than the inner wheel. Such is an adaption of the front wheel geometry disclosed in my U.S. Pat. No. 4,903,857.

The radius length of the arcuate path of the inboard link end bearings 75 and 76 is approximately 20 percent (0.2) greater than the radius length of the arcuate path of the outboard link end bearings 77 and 78 (approximately 3 inches vs 2½ inches) to provide an amplifying ratio so that the handlebar 55 need be rotated through a lesser angle than the actual turning of the front wheels 19 and 20.

The disclosed geometric relationship further minimizes interaction between the propulsion and steering motions, from the single handlebar, even during maximum propulsion strokes of the handlebar 55 about the lateral pivot axis X—X'. To appreciate this feature, it is noted that the inboard link end bearings 75 and 76 (represented at b and d respectively in FIG. 7) follow along an arcuate or circular path at a given radius about the center of rotation of steering shaft 57 (y in FIG. 7), as they are moved in the steering action, such as to the maximum right turn position 75' (e in FIG. 7) and the maximum left turn position of bearing 76 (not shown in FIG. 5 but depicted as f in FIG. 7). The maximum right turn position is determined when the steering arm 56 butts against the right finger 61 (see FIG. 5) of the column assembly and the maximum left turn position (not shown) is determined when the steering arm 56 butts against a left stop post 82 of the column assembly. This traces an arc path e, g, b, c, d, h, f that lies in the plane extending perpendicular to the column 58, this plane being also depicted edgewise by line y-c in FIG. 6).

The lateral pivot axis X—X' of the column 58 is located to pass approximately thru the arc path (or plane) formed by the moving inboard link end bearings 75 and 76. Specifically as illustrated, point y (and line z-y in FIG. 6) depict the center of rotation of the steering shaft 57 and arm 56; points b and d depict the inboard link end bearings 75 and 76 in their mid or vehicle straight ahead steering positions; and points e and f depict the right and left inboard link end bearings 75 and 76 in their maximum right and left steering positions respectively. Points g and h depict the intersections between the pivot axis X—X' and this arc path. In the illustration, the respective right and left points are generally symmetrical of the midpoint c.

Figure 7:
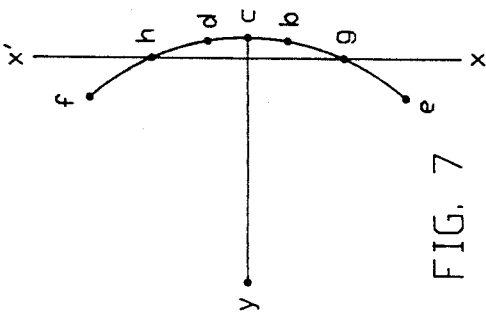
FIGS. 6 and 7 are elevational and plan views corresponding to FIGS. 4 and 5, respectively, depicting the geometry of motion of the pivot centers of the steering linkage, resulting from the push-pull driving action of the handlebar (in FIG. 6) and the rotating steering action of the handlebar (in FIG. 7)
Figure 6:
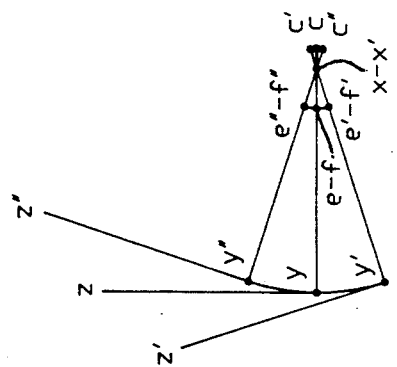

In the preferred linkage orientation, the length of arc g-b-c-d-h equals approximately half the length of arc e-g-b-c-d-h-f. Using this geometry results in point c (or points b and d) being less distance in front of axis X—X' (on the side thereof opposite center y) than points e and f are behind axis X—X'. In FIGS. 6 and 7, the line y-c illustrates the steering arm 56 in the mid or vehicle straight ahead steering position, and would lie generally perpendicular to the column 58 (line z-y) and perpendicular to and through the lateral pivot axis X—X'.

As referenced in FIGS. 4 and 6, the line z-y-c depicts the axial center of column 58 with the steering arm 56 in its midpoint propulsion position, while lines z'-y'-c' and z"-y"-c" depict the axial center of column 58 and steering arm 56 in the maximum rearward and forward propulsion positions, respectively. These general depictions correspond to the illustration of FIG. 7, where point y represents the column center and the steering arm 56 (line y-c) is in its mid or straight ahead steering position.

Distances between point c and the points c' and c" depict the approximate displacement, above and below the midpoint c, of the inboard ends of links 73 and 74 at maximum propulsion stroke positions when the vehicle 10 is being steered to move along a substantially straight path. The illustrated inboard link ends b and d would be displaced less than the midpoint c. The inboard link end depictions at points e'-f' and e"-f" illustrate the approximate maximum displacement below and above the midpoint propulsion location e-f of the inboard link ends at maximum propulsion stroke positions when the vehicle 10 is making maximum right or left turns.

The preferred linkage provides that the column pivot axis X—X' is offset from a parallel tangent line from the arcuate path at c by a distance less than 20% (0.2) of the length of the steering arm 56 (or y-c). A specific vehicle example might have the steering arm 56 (distance from y to c) of a 3-inch length, and the pivot axis X—X' might be radially offset 0.25 inches or 8% (0.08) in from point c. Also, pivot axis X—X' should intersect the bearing path arc e-c-f at g and h, providing that the length of arc g-c-h would be approximately half the length of arc e-c-f. For a maximum propulsion stroke of substantially 35 degrees for the column 58 and handlebar 55 about pivot axis X—X', the angular oscillation of z-y-c to z'-y'-c' or z"-y"-c" about pivot axis X—X' would be approximately 17.5 degrees and the arcuate oscillation displacement between point c and points c' or c" would be less than 0.08 inches. This oscillation displacement represents less than 3% (0.03) of the steering arm length.

Figure 8:
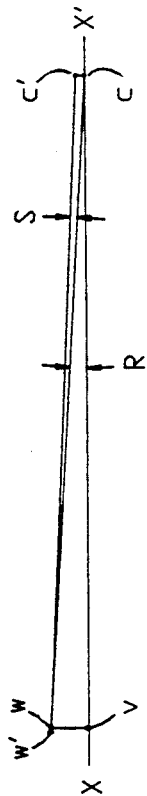
FIG. 8 is an elevational view, related to FIG. 7, looking perpendicular to the right connecting link and depicting the geometry of motion of the link end connections resulting from the push-pull driving action of the column and handlebar (in FIG. 6)

Further, the right and left links 73 and 74 would be much longer (at least twenty-five times) than this small oscillation displacement of the inboard link end bearings 75 and 76. A specific vehicle example might have an effective link length between its end bearings (line c to w in FIG. 8) of 12.6 inches (or more than approximately four times the length of steering arm 56 and more than one hundred fifty times the oscillation displacement). In the specific illustration, each link 73 and 74 would be oriented almost horizontally with the center of its outboard end bearing (point w) being approximately 0.8 inches (distance v to w) above the arc path or plane of the inboard link end (when the steering linkage was set to steer the vehicle straight ahead and the column 58 was at its midpoint propulsion location). The angular relationship between lines c to w and c to v, designated as angle R (using the 12.6-inch link length and 0.8-inch link end offset values) would be about 3.6 degrees. With an approximate 2.5-inch radius turning arm about axis P—P' (referring to FIG. 5), the lateral arcuate displacement of the outboard link end (distance w to w') resulting from the 0.08-inch vertical oscillation displacement of inboard link end from point c to point c' would be less than 0.002 inches, resulting in angle S (FIG. 8) being less than 0.04 degrees.

Thus, oscillation induced displacements caused by the propulsion stroke create a negligible turning of the right front wheel 19 (approximately 0.09 degrees); and any turning of the left front wheel 20 would be of a related insignificant magnitude. To minimize the w—w' displacement, both angles R and S should be held to a practical minimum (less than perhaps 10 degrees for R and 2 degrees for S, where the rate of change of the cosine function is relatively small for any angle change). Having the propulsion pivot axis X—X' intersect the forward but intermediate portions of the arcuate path e-c-f of the inboard steering link ends and having long steering link lengths c-w, provide planes of motion at relatively small angles with the plane of the arc e-c-f (angle R) so that the angle S (c-w-c') remains extremely small as does the lateral displacement distance w—w' of the outboard link ends. Also, the effective turning arms 71 and 72 (between the turning axis P—P' and O—O' and outboard link end bearings 77 and 78) are oriented to be at sharp angles and preferably even pass through being at right angles relative to links 73 and 74, during their operation, respectively. The links thus effectively extend tangentially of the arc paths. The outboard link ends operate in arc paths or planes that are only a few degrees out of being parallel to the arc paths of the inboard link ends when the vehicle is steered to move straight ahead. The amplifying steering ratio of the steering arm to the turning arms lessens the included angle and length of the maximum arcuate path e-c-f (see FIG. 7), which in turn decreases the maximum vertical oscillation displacements of the inboard link ends and any resulting lateral displacement of the outboard link ends, even when making simultaneous propulsion strokes and turning the vehicle. When the lateral separation between the inboard link ends is kept small or zero, the length and included angle of the arcuate path e-c-f are likewise reduced.

It should be appreciated further that the oscillation displacement of the inboard link ends caused by the propulsion strokes of the column 58, when the vehicle is moving straight forward or making minor turns, is less than when the vehicle is making the maximum right or left turns. The vehicle will be moving slowly during "sharper" turns; therefore, the rider will seldom apply the full propulsion stroke to the handlebar, and partial power strokes by themselves lessen the oscillation displacement of the inboard link ends.

In the illustration, the links 73 and 74 are angular behind the X—X' pivot axis to provide structural clearance with the right and left bearing housings 51 and 52, respectively. Also, while the pivot axis X—X' is illustrated in front of the plane between the wheel turning axes P—P' and O—O', and the turning arms project forwardly from the connecting means 13 in front of the axes O—O' and P—P', this orientation could be reversed somewhat as a mirror image to provide an alternative vehicle arrangement. However, the distance between the front and rear wheels would then have to be increased to accomodate the rider, which would undesirably increase the vehicle turning radius.

Figure 9:
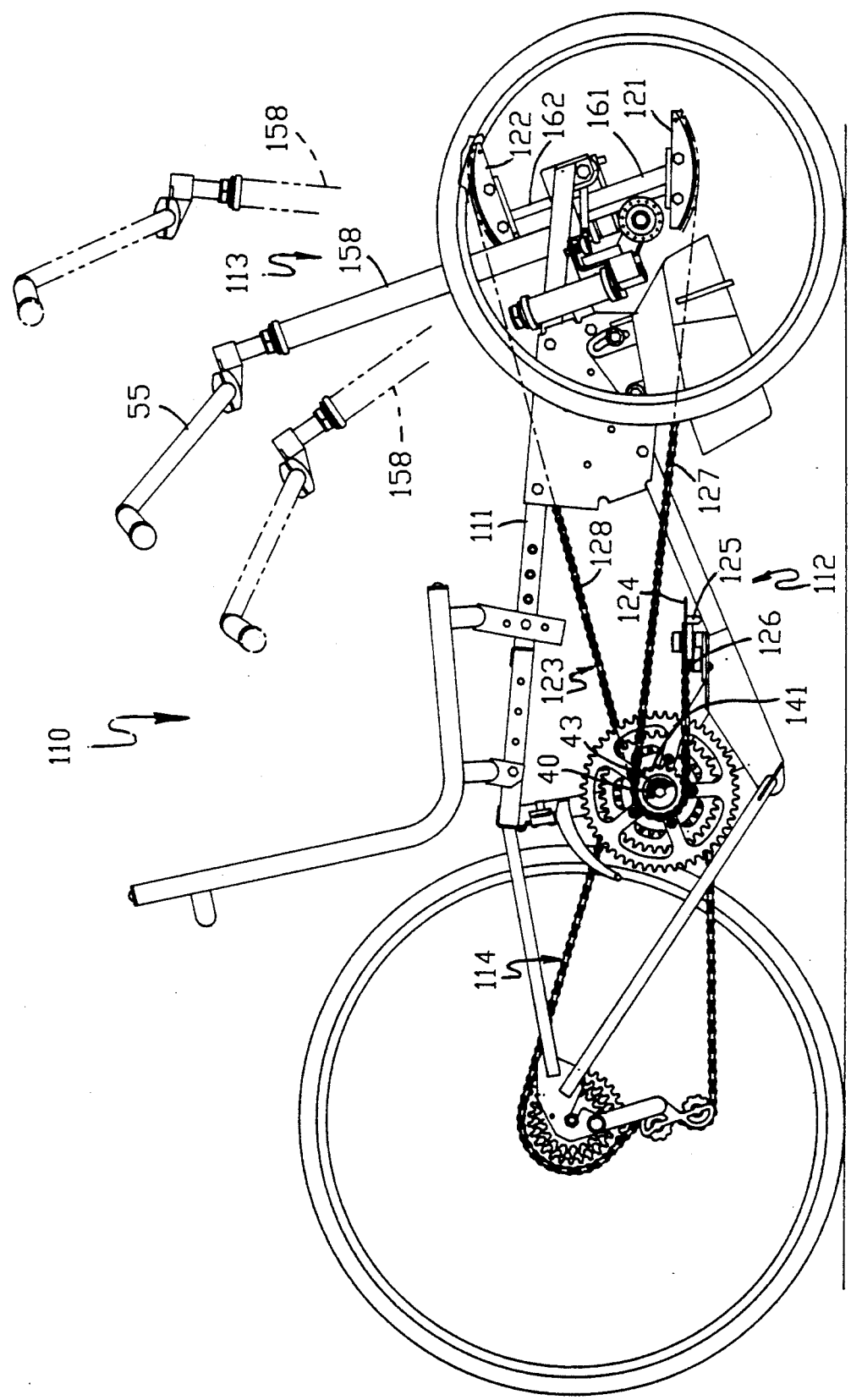
FIGS. 9 and 10 are elevational and plan views, similar to FIGS. 1 and 2, respectively, of an alternate embodiment of a three wheel vehicle formed according to this invention, again showing the handlebar and column in solid in an intermediate driving position and in phantom in their maximum forward and rearward driving positions, and showing the front wheels in solid oriented for straight ahead vehicle movement and in phantom for making a maximum right turn.
Figure 10:
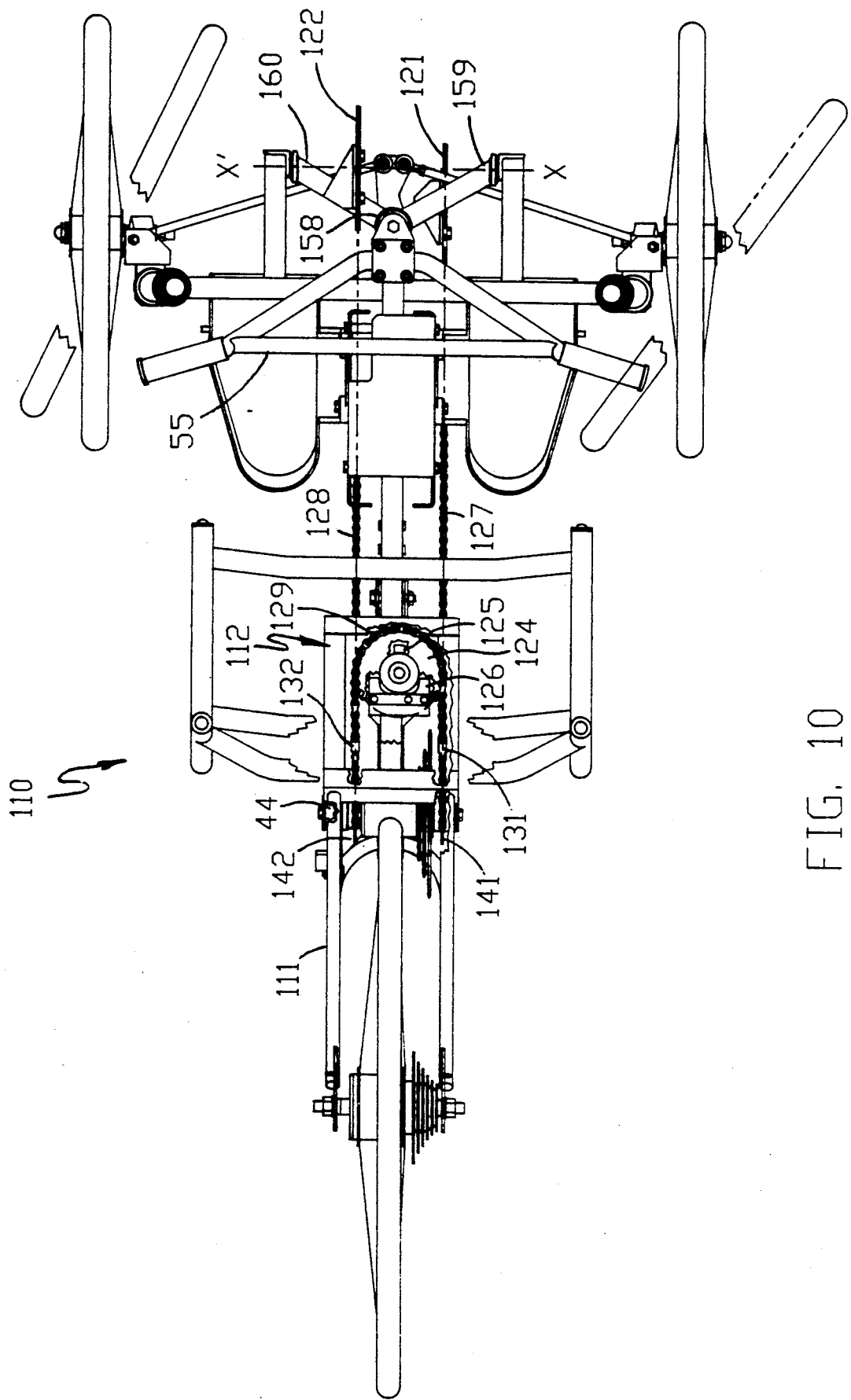

Referring to FIGS. 9 and 10, a second embodiment of a three wheel vehicle 110 closely related to the vehicle 10 is illustrated, having similar components except as now specifically described. Thus, the vehicle 110 incorporates frame 111, and has a serpentine tension member system 112 between pivotal steering means 113 and drive assembly 114.

Specifically, column 158 (in place of column 58) is pivoted to the frame 111 and includes forwardly extended right and left arms 159 and 160, and has attached thereto right and left fingers 161 and 162 which are attached to right and left control sectors 121 and 122, respectively.

Right and left power sprockets 141 and 142 (in place of the right and left drive arms 41 and 42) are mounted to rotate about drive shaft 40, and a reversing sprocket 124 is rotatably connected to the frame 111. The serpentine tension member system 112 incorporates a flexible tension member or chain 123 connected at its opposite ends to the front portion of the right and left control sectors 121 and 122, and trained over the rearward teeth of the right and left power sprockets 141 and 142 and the forward teeth of the reversing sprocket 124, and includes right and left sections 127 and 128, right and left 90 degree couplings 131 and 132, and a central section 129. A resilient stop block 126 is connected to the frame 111 to be abutted in the extreme forward and rearward drive positions of the column 158 by a stop arm 125 connected to the sprocket 124. Thus, the right and left stop rods 46 and 47, in FIGS. 1 and 2, are eliminated and replaced by stops 125 and 126 incorporated as part of the flexible tension member system 112.

Pushing the handlebar 55 forwardly, to rotate the column 158 about its pivot axis X—X', applies a pulling force to the left section 128 of flexible tension member 123 through its connection to the left control sector 122, which generates torque via overrunning clutch 44 to the drive shaft 40 by rotating the left power sprocket 142 in a clockwise direction, as seen in FIG. 9. This provides a vehicle propulsion stroke, for forward movement. This pulling force also rotates the right power sprocket 141 in a counterclockwise direction, but the right overrunning clutch 43 transmits no power to the drive shaft 40.

Pulling rearwardly on the handlebar 55 rotates the column 158 about its pivot axis X—X' and applies a pulling force to the right section 127 of flexible tension member 123 through its connection to the right control sector 121, which generates torque via overrunning clutch 43 to drive shaft 40 by rotating the right power sprocket 141 in a clockwise direction, as seen in FIG. 9. This again provides a forward vehicle propulsion stroke, and the rotating left power sprocket 142 via its overrunning clutch 44 transmits no power to the drive shaft 40.

The serpentine tension member system 112 provides the means to power the vehicle 110 forward, except that it provides a torque that is substantially proportional to the force being applied for the entire stroke, for both the push and the pull action. Also, engagement of the rotating stop arm 125 with the resilient stop block 126 decelerates the column 158 oscillation, in both the forward and rearward directions, to lessen the quick stop impact on the operator's hands at the opposite ends of the full stroke motions. It is possible also to use less than a full power stroke, which would eliminate possible impact deceleration on the hands before the hand motion is reversed, or to have no power stroke during which time the vehicle 110 can coast.

In both disclosed embodiments, the preferred vehicle makes use of two smaller front wheels, each mounted on a wheelchair hub instead of on a conventional fork over the wheel, to reduce the size of the vehicle without reducing its performance. This also permits the turning pivot bearings and their housings to be positioned between the wheels instead of above the wheels and reduces the frame size both in width and height. This provides a sufficiently narrow vehicle to pass through conventional doorways or passageways. Moreover, the lower frame and seat establishes a low center of gravity for rider and vehicle stability, and facilitates easy rider mounting and demounting relative to the vehicle.

While particular embodiments of the present invention have been shown and described, it will be obvious to those skilled in the art that changes and modifications may be made without departing from the invention in its broader aspects. For example, different speed drives may be substituted for the disclosed multi-speed drive, or two rear wheels may be substituted for the single rear drive wheel. Also, the invention may be used to power and steer other forms of vehicles, such as a boat, where the push-pull handlebar action could power the boat propulsion means and the turning handlebar action could operate the boat steering means. Also, the serpentine tension member system could be modified to use a cable or a "V", "Hex", or round belt for all or a portion of the flexible tension member, and pulleys may replace the sprockets. The matters set forth in the foregoing description and accompanying drawings are offered by way of illustration only and not as limitations. Therefore, the appended claims are intended to cover the invention and all changes and modifications as might fall within their spirit and scope.

What is claimed as my invention is:

1. A vehicle comprising the combination of:
   a frame, two laterally spaced right and left front wheels and at least one rear wheel, means supporting the wheels to rotate relative to the frame about generally horizontal axes, and means supporting the front wheels to steer about generally vertical steering axes;
   a column and means supporting the column relative to the frame for oscillation about a laterally extended pivot axis, and means operatively coupling the column, at locations spaced from the pivot axis thereof, to the rear wheel, operable for powering the rear wheel upon column oscillation relative to the frame; and
   a steering member rotatably mounted within the column and presenting an arm, and elongated laterally extended rigid right and left links connected pivotally at inboard ends thereof to the steering member arm at locations having a radially spacing from the column and connected at outboard ends thereof to the respective right and left front wheels, operatively joining the front wheels to the steering member;
   the inboard link ends moving along an arcuate path concentrically of the column, upon steering member rotation in steering the vehicle;
   said arcuate path and said column pivot axis being located relative to one another to provide that said pivot axis generally intersects the arcuate path at two spaced intermediate axis-path intersections symmetrically disposed generally of a midpoint position of the steering member when oriented to provide for straight ahead vehicle movement.

2. A vehicle according to claim 1, further including said arcuate path and said pivot axis being located relative to one another to provide that the arcuate path between the axis-path intersections has a length which is less than approximately one-half an overall length of the arcuate path generated by maximum turning of the vehicle rightwardly and leftwardly.

3. A vehicle according to claim 1, further including the pivot axis being offset from a parallel tangent line from the arcuate path by a distance less than approximately 20% (0.2) of the radial spacing of the inboard link ends from the column.

4. A vehicle according to claim 1, further including the inboard link ends in the midpoint position of the steering member being in a portion of the arcuate path which is between the axis-path intersections.

5. A vehicle according to claim 1, further including a turning arm radially extended from each front wheel steering axis and operatively coupled to a respective said front wheel, and each respective outboard link end being connected to a respective said turning arm at a radial distance from a respective said steering axis less than the radial spacing of the inboard link ends from the column.

6. A vehicle according to claim 5, further including each front wheel steering axis being angled from the vertical, forwardly and diverging outwardly in a downward direction, and each said link and a respective said steering arm being angled relative to one another in the midpoint position of the steering member.

7. A vehicle according to claim 1, further including a length of each elongated rigid link being at least approximately four times the radial spacing of the inboard link end thereof from the column.

8. A vehicle according to claim 1, further including the elongated rigid links being longer by a ratio at least 25:1 than an oscillation displacement of the inboard ends thereof when oscillating the column relative to the frame for powering the vehicle.

9. A vehicle according to claim 1, further including the elongated rigid links being oriented generally in a direction of the pivot axis, and each link being within an angle less than approximately 10 degrees of being parallel to the pivot axis, measured in a direction of oscillation displacement.

10. A vehicle according to claim 1, further including means to limit the column oscillation to 25–40 degrees maximum about the pivot axis, and the pivot axis being offset from a parallel tangent line from the arcuate path by a distance less than approximately 20% (0.2) of the radial spacing of the inboard link ends from the column.

11. A vehicle according to claim 1, further including the pivot axis being offset from a parallel tangent line from the arcuate path by a distance less than approximately 20% (2.0) of the radial spacing of the inboard link ends from the column, and said arcuate path and said pivot axis being located relative to one another to provide that the arcuate path between the axis-path intersections has a length which is less than approximately one-half an overall length of the arcuate path generated by maximum turning of the vehicle rightwardly and leftwardly.

12. A vehicle according to claim 11, further including the elongated rigid links being oriented generally in a direction of the pivot axis at a slight offset from the pivot axis, and each link being within an angle less than approximately 10 degrees of being parallel to the pivot axis, measured in a direction of oscillation displacement.

13. A vehicle according to claim 12, further including the elongated rigid links being longer by a ratio at least 25:1 than an oscillation displacement of the inboard ends thereof when oscillating the column relative to the frame for powering the vehicle.

14. A vehicle according to claim 13, further including a length of each elongated rigid link being at least approximately four times the radial spacing of the inboard link end thereof from the column.

15. A vehicle according to claim 14, further including means to limit the column oscillation to 25–40 degrees about the pivot axis.

16. A vehicle according to claim 15, further including a turning arm radially extended from each front wheel steering axis and operatively coupled to a respective said front wheel, and each respective outboard link end being connected to a respective said turning arm at a radial distance from a respective said steering axis less than the radial spacing of the inboard link ends from the column.

17. A vehicle according to claim 15, further including each front wheel steering axis being angled from the vertical, forwardly and diverging outwardly in a downward direction, and each said link and a respective said steering arm being angled relative to one another in the midpoint position of the steering member.

18. A vehicle according to claim 1, further including said rear wheel powering means being comprised of a pair of oppositely operating couplings between the column and the rear wheel, an overrunning clutch associated with each coupling, and each clutch being engaged only upon column oscillation in one direction and the respective clutches being engaged upon column oscillation in opposite directions, operable to power the rear wheel unidirectionally upon column oscillation in both directions relative to the frame.

* * * * *